United States Patent
Xu et al.

(10) Patent No.: US 7,254,379 B2
(45) Date of Patent: Aug. 7, 2007

(54) RF RECEIVER MISMATCH CALIBRATION SYSTEM AND METHOD

(75) Inventors: Zhiwei Xu, Los Angeles, CA (US); Shan Jiang, San Gabriel, CA (US); Charles Chien, Newbury Park, CA (US)

(73) Assignee: Silicon Storage Technology, Inc., Sunnyvale, CA (US)

( * ) Notice: Subject to any disclaimer, the term of this patent is extended or adjusted under 35 U.S.C. 154(b) by 439 days.

(21) Appl. No.: 10/887,702

(22) Filed: Jul. 9, 2004

(65) Prior Publication Data

US 2006/0009180 A1    Jan. 12, 2006

(51) Int. Cl.
  *H04B 1/10* (2006.01)
  *H04B 17/00* (2006.01)
  *H04L 1/00* (2006.01)

(52) U.S. Cl. ............... 455/296; 455/304; 455/312; 455/67.11; 455/67.13; 375/346

(58) Field of Classification Search ........ 455/296, 455/303–307, 311, 312; 375/346–349
See application file for complete search history.

(56) References Cited

U.S. PATENT DOCUMENTS

| | | | | |
|---|---|---|---|---|
| 4,401,898 A * | 8/1983 | Sommerer | ............... | 327/513 |
| 4,475,088 A * | 10/1984 | Beard | ............... | 331/25 |
| 5,140,198 A * | 8/1992 | Atherly et al. | ............... | 327/113 |
| 6,009,317 A * | 12/1999 | Wynn | ............... | 455/296 |
| 6,154,073 A * | 11/2000 | Choi | ............... | 327/161 |
| 6,317,589 B1 * | 11/2001 | Nash | ............... | 455/245.2 |
| 6,400,197 B2 * | 6/2002 | Lai et al. | ............... | 327/161 |
| 6,735,422 B1 * | 5/2004 | Baldwin et al. | ............... | 455/232.1 |
| 6,999,746 B2 * | 2/2006 | Wang | ............... | 455/323 |
| 7,050,778 B1 * | 5/2006 | Olson | ............... | 455/296 |
| 7,123,103 B1 * | 10/2006 | Rosik et al. | ............... | 331/45 |
| 2003/0053563 A1 * | 3/2003 | Mohindra | ............... | 375/324 |

* cited by examiner

*Primary Examiner*—Duc M. Nguyen
(74) *Attorney, Agent, or Firm*—DLA Piper US LLP

(57) ABSTRACT

A calibration system for an RF system that includes an RF receiver capable of operating in a normal mode and in a calibration mode. The calibration system includes a phase delay unit provided on at least one of an I channel output and a Q channel output of the RF receiver. The system further includes a phase detector configured to detect a phase difference between the I channel output of the RF receiver and the Q channel output of the RF receiver. The system also includes a calibration control unit configured to provide a digital calibration control signal to the RF receiver based on the phase difference as provided by the phase detector.

20 Claims, 13 Drawing Sheets

- Ideal Signal
- Receiving Signal

Effect of I/Q Phase Mismatch on QPSK signal constellation

Effect of I/Q Amplitude Mismatch on QPSK signal constellation

VCDL Calibration Flow

Receiver Calibration Flow

US 7,254,379 B2

RF RECEIVER MISMATCH CALIBRATION SYSTEM AND METHOD

BACKGROUND OF THE INVENTION

A. Field of the Invention

The present invention relates generally to the field of wireless communications. More particularly, the present invention relates to RF receiver mismatch calibration.

B. Background

Recently, the demand for wireless communication has grown significantly, such as for wireless local area networks (LAN), home wireless control systems and wireless multimedia centers. Along with this growth in demand, there has been an increased interest in more bandwidth, more powerful and cheaper chips. For example, the maximum 11 Mb/s bandwidth offered by the IEEE 802.11b standard cannot satisfy the growing demand on higher bandwidth. Rather, 54 Mb/s rate offered by the 802.11g or 11a standards is preferred. To transmit in this bandwidth with just a 20 MHz wide channel, more advanced modulation methods other than simple binary phase shift keying (BPSK) or quadrature phase shift keying (QPSK) should be adopted. In the IEEE 802.11a/g wide local area network (WLAN) system, the data is modulated with BPSK, QPSK, 16QAM (quadrature amplitude modulation) or 64QAM, and is further mapped onto 52 subcarriers of an orthogonal-frequency-division-multiplexed (OFDM) signal.

To take advantage of the high bandwidth, the OFDM-based wireless system and other radio systems with sophisticated modulation methods pose significant implementation challenges. These challenges include requiring low in-band phase noise, high linearity and accurate quadrature matching inside the RF chip. Among them, quadrature matching is the most complicated issue since it arises from the device mismatch and since it varies from chip to chip. Also the requirement for the mismatch is typically very tight. For example, in order to meet the receiver Error Vector Magnitude (EVM) specification for 54 Mb/s mode in a WLAN system with a 3-dB implementation margin, which indicates the quality of the digital modulated signals, system simulation shows that an I/Q mismatch of less than 1°/0.2 dB is required.

An RF receiver used in a wireless system performs RF signal de-modulation, down-conversion of the signal, adjacent interference rejection and baseband signal amplification. Compared with an unchanged transmitter implementation, there are many parameters to be addressed in an RF receiver realization. This is because there are more considerations for a receiver design, such as noise, linearity, interference rejection and band selection. Although the homodyne (direct conversion) receiver architecture has been in use for many years, the heterodyne receiver architecture is the first to be widely used. The heterodyne receiver architecture utilizes a mixer to translate a filtered channel centered at a high frequency to a much lower intermediate frequency, so as to relax the required quality of the channel select filter. Since the local oscillation (LO) frequency of the mixer is different from the input RF frequency, it has to deal with an image problem that occurs during the receiving process. Image rejection filter and other topologies such as dual-IF architecture are exploited to improve the reception. However, the mismatch between the inphase and quadrature (I/Q) branches degrades the receiver performance if the I/Q separation occurs inside the RF chip. A dual IF architecture has the advantage of alleviating this problem because the I/Q separation occurs at a lower frequency path which tends to have smaller mismatch. This is especially true for the phase mismatch as compared with the separation occurring at a higher frequency path.

If the down conversion mixer of the RF receiver converts the high frequency signal directly to the zero intermediate frequency, the RF receiver is called a homodyne wireless receiver, which is also referred to as a "direct conversion" or "zero-IF" receiver. It avoids the image problem in the heterodyne receiver architecture, but it introduces DC offset voltage during receiving, which is generated by the self-mixing between the LO signals and the LO leakage from both the receiver and the transmitter. Moreover, because the I/Q separation in the homodyne receiver architecture occurs at an RF frequency, it suffers from a larger phase mismatch.

The trade-offs governing the utilization of image-reject filters in the heterodyne receiver architecture have motivated RF designers to seek other techniques for suppressing the images. Hartley architectures and Weaver architecture are two such examples. Since these architectures utilize the signals in quadrature branches to do the image rejection, they are more prone to mismatch as compared to the homodyne and the heterodyne receiver architectures. Also, digital IF receivers that perform I/Q separation in the digital domain remove the mismatch in the RF receiver but increase the complexity for the digital processing circuit.

FIGS. 1 to 3 show the above conventional cases. FIG. 1 shows an RF receiver in which the quadrature signals separation occurs at a high frequency domain. This conversion method is adopted by one step direct conversion receiver and image rejection receiver such as the Weaver or the Hartley type. The architecture shown in FIG. 1 is the most sensitive to quadrature mismatches. As shown in FIG. 1, an input RF signal $f_{LO}$+fs (whereby fs is an input signal that is modulated with a carrier frequency $f_{LO}$ by an RF transmitter, not shown) is received by a receiver antenna 110, and provided to a low noise amplifier (LNA) 120. The output of the LNA 120 is provided to an I/Q mixer 125, whereby the input RF signal is mixed with a local oscillator signal LO output by a local oscillator 127, to provide baseband I and Q signals that are filtered by a filter 130 in order to remove the adjacent interference. Accordingly, the input signal fs is obtained, and is provided to a variable gain amplifier VGA 140, whereby the output of the VGA 140 corresponds to the demodulated RF signal. The demodulated RF signal is then provided to a digital baseband circuit, for additional processing (e.g., digital signal processing).

FIG. 2 shows an RF receiver 200 in which the quadrature signals separation occurs at a relatively lower frequency as compared to the RF receiver 100 of FIG. 1. The RF receiver 200 of FIG. 2 has a lesser quadrature mismatch problem as compared to the RF receiver 100 of FIG. 1, whereby the RF receiver 200 of FIG. 2 is used by either a dual IF direct conversion receiver system or by a heterodyne receiver system. As shown in FIG. 2, an input RF signal $f_{LO1}$+$f_{LO2}$+$f_s$ (whereby $f_s$ is an input signal that is modulated by carriers $f_{LO1}$ and $f_{LO2}$ by an RF transmitter, not shown) is received by a receiver antenna 210, and provided to an LNA 220. The output of the LNA 220 is provided to a first mixer 225, whereby the input RF signal is mixed with a first local oscillator signal LO1 output by a first local oscillator 227, to provide an intermediate frequency (IF) signal $f_{LO2}$+$f_s$ (and its sideband image). The sideband image is filtered by off-chip filter 230, and the intermediate frequency signal is then provided to a second mixer (I/Q mixer) 240, whereby I/Q separation occurs at IF. The second mixer 240 mixes the IF signal with a second local oscillator signal LO2 output by a second local oscillator 242, to provide a baseband signal (and its sideband image). A filter 250 filters the adjacent inteference, to thereby provide the input signal fs to a VGA 260, whereby the output of the VGA 260 corresponds to the demodulated RF signal. The demodulated RF signal is then provided to a digital baseband unit (not shown), for further processing of the received data (e.g., digital signal processing).

FIG. 3 shows an RF receiver 300 in which the quadrature signals separation occurs in a digital base band circuit after the RF receiver and after quantization. The approach of FIG. 3 is free of quadrature mismatch (also referred to herein simply as "mismatch"). The difference between the RF receiver 300 and the RF receiver 200 of FIG. 2 is that I/Q separation occurs at the output of the VGA 360 in FIG. 3 (digital I/Q separation), whereby the I/Q separation occurs at the output of the second mixer 240 in FIG. 2 (analog I/Q separation). In the RF receiver 300 of FIG. 3, the second mixer 340 is not an I/Q mixer.

Different calibration methods have been utilized to perform calibration for conventional RF transceivers. Some of calibration methods use a local transmitter, which has already been calibrated, to send the test vectors to the RF receiver and compute the mismatch compensation factor through a digital signal processing (DSP) machine in a digital baseband circuit of the RF transceiver. This is called "local calibration" and typically is performed during a system power up process or during an idle time (e.g., between times when data is sent from an RF transmitter to an RF receiver). Compensation factors can be applied to the RF transceiver if there is mismatch compensation detected within an RF chip of the RF transceiver, or they can be directly applied after analog-to-digital conversion (ADC) in the digital domain.

In another type of calibration method, a remote transmitter adds particular information (e.g., predetermined data) in the transmitting sequence to aid in the receiver calibration at the RF receiver. This type of calibration can be done in real time, whereby it results in decreased channel efficiency (due to the extra coding spent performing calibration). This calibration method is typically referred to as "remote calibration".

In terms of mismatch detection and calibration locations, the conventional calibration methods can be categorized into two subtypes. In a first subtype, both the mismatch detection and the calibration are done by a digital baseband circuit of the RF transceiver. As shown in FIG. 4, a digital baseband circuit 410 transmits a pilot sequence to an RF chip (RF transceiver) 420, whereby the pilot sequence is modulated into a high frequency signal by a transmitter (included in the digital baseband circuit 410). The RF chip 420 receives and transmits signals over-the-air to/from a remote RF transceiver, via RF antenna 450. During calibration, the RF chip 420 couples the transmitter output of the digital baseband circuit 410 to its receiver input (by way of an RF switch on chip, not shown). In that way, the local digital baseband can receive the demodulated signal output from the RF chip 420 (by way of an A/D converter 440) at the same time it is providing calibration data to the RF chip 420 (by way of a local loop). An error signal output by the digital baseband circuit 410 is subtracted from the A/D output of the A/D converter 440 in the local loop (which corresponds to a digital representation of the original calibration signal), to thereby provide a correction signal to the digital baseband circuit 410 (which is used to calibrate the RF chip 420).

A powerful DSP machine within the digital baseband circuit 410 is required to calculate the phase and amplitude mismatch of the RF link and generate the "error" signals to calibrate the RF link. Although the calibration is easy to control in the digital domain, it imposes several disadvantages: 1) The DSP machine is complicated and the computation takes a long time to get the desired accuracy; 2) it cannot work without an RF transmitter; 3) the mismatch introduced by the transmitter has to be considered since the transmitter mismatch cannot be completely cancelled; 4) the hardware mismatch is intact and the performance degradation introduced by those mismatches, such as second order inter-modulation, are still there; and 5) the extra connection between the transmitter and the receiver of the RF chip 420 complicates the design.

FIG. 5 shows the second subtype for performing calibration, whereby this system uses a digital baseband circuit to detect the signal mismatch while the circuits inside the RF chip (RF transceiver) 520 perform the calibration (based on information provided by the digital baseband circuit 510). Like the system of FIG. 4, a local loop that includes a D/A converter 530 and an A/D converter 540 is used to provide calibration data to and from the digital baseband circuit 510 and the RF chip 520. The RF chip 520 receives and transmits signals over-the-air to/from a remote RF transceiver, via RF antenna 550 during normal application. During calibration, the RF chip 520 receives the signal sent by itself through an on chip RF switch (not shown). Note that the system of FIG. 5 utilizes a calibration command that is output from the digital baseband circuit 510 directly to the RF chip 520, which is different from the way calibration is performed in the system of FIG. 4.

The disadvantages of this second subtype of calibration are: 1) complicated DSP machine and required substantial computational power; 2) dependence on RF transmitter; 3) introduction of the transmitter mismatch since the transmitter mismatch cannot be completely calibrated out; and 4) extra connection required between the transmitter and the receiver inside the RF chip complicates the design.

Since the mismatch detection or the calibration are done by the baseband digital circuit for both the first and the second calibration subtypes discussed above, even if the mismatch is calibrated out for one single frequency and under particular test vectors; their effects will still show in other frequency bands or with different input signals. To improve the existing calibration methods, different compensation factors are applied to each frequency band and with various input signals, which exploit extra memory such as a random access memory (RAM) or an electrically erasable programmable read only memory (EEPROM), in order to store a compensation look-up table. Also, the calibration period becomes longer accordingly because the mismatches should preferably be calculated under different conditions.

Among all of above conventional calibration methods described above, the phase mismatch and amplitude mismatch are calibrated together, whereby it is difficult to differentiate between them. Actually, in an RF receiver, the phase mismatch is more serious than the amplitude mismatch. The phase mismatch is contributed by the local oscillation (LO) signals and down-conversion mixer and is difficult to minimize. This is because the small device mismatch is converted into a relatively large phase offset in high frequency and the circuit working in the RF domain cannot tolerate too much parasitic capacitance which limits the application of layout optimization method such as crossing or interdigitation. Monte Carlo simulation shows that the LO signals could easily have 1.5 degree phase mismatch at 5 GHz, while the down-conversion mixer contributes 1 degree. Thus, there is a total of at least 2.5 degrees phase mismatch.

SUMMARY OF THE INVENTION

One aspect of the present invention provides for calibrating the phase mismatch of an RF transceiver without the need for a transmitter or a digital baseband.

Another aspect of the present invention provides for the use of a slide mixing technique to perform self-calibration of a down conversion mixer of an RF receiver.

Yet another aspect of the present invention provides for an independent calibration loop to perform phase mismatch calibration of an LO generator, a mixer, and/or a divide-by-two circuit of an RF receiver chain.

Still another aspect of the present invention provides for increased calibration accuracy by high frequency phase mismatch to low frequency timing mismatch. The lower the frequency used in the timing mismatch translation, the higher the calibration accuracy obtained (but the longer the calibration time required).

Another aspect of the present invention provides for phase mismatch calibration of a Local Oscillator and/or a down conversion mixer, in which both gain mismatch and phase mismatch are decreased.

According to at least one aspect of the invention, there is provided a calibration system for an RF system which includes an RF receiver capable of operating in a normal mode and in a calibration mode. The RF system also includes a phase delay unit provided on at least one of an I channel output and a Q channel output of the RF receiver. The RF system further includes a phase detector configured to detect a phase difference between the I channel output of the RF receiver and the Q channel output of the RF receiver. The RF system still further includes a calibration control unit configured to provide a digital calibration control signal to the RF receiver based on the phase difference as provided by the phase detector.

According to another aspect of the invention, there is provided a method of calibrating an RF receiver, which includes providing a first local oscillation signal to an input of the RF receiver during a calibration mode, as an calibration input signal. The method also includes mixing the calibration input signal with a second local oscillation signal at a same frequency as the first local oscillation signal, and with a third local oscillation signal at a frequency lower than the first and second local oscillation signals. The method further includes delaying at least one of signals on I and Q channel outputs of the RF receiver. The method still further includes detecting a phase difference between the delayed at least one of signals on the I and Q channels. The method also includes providing a calibration signal to the RF receiver based on the detected phase difference.

Other features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The foregoing advantages and features of the invention will become apparent upon reference to the following detailed description and the accompanying drawings, of which.

DETAILED DESCRIPTION OF THE INVENTION

Figure 1:
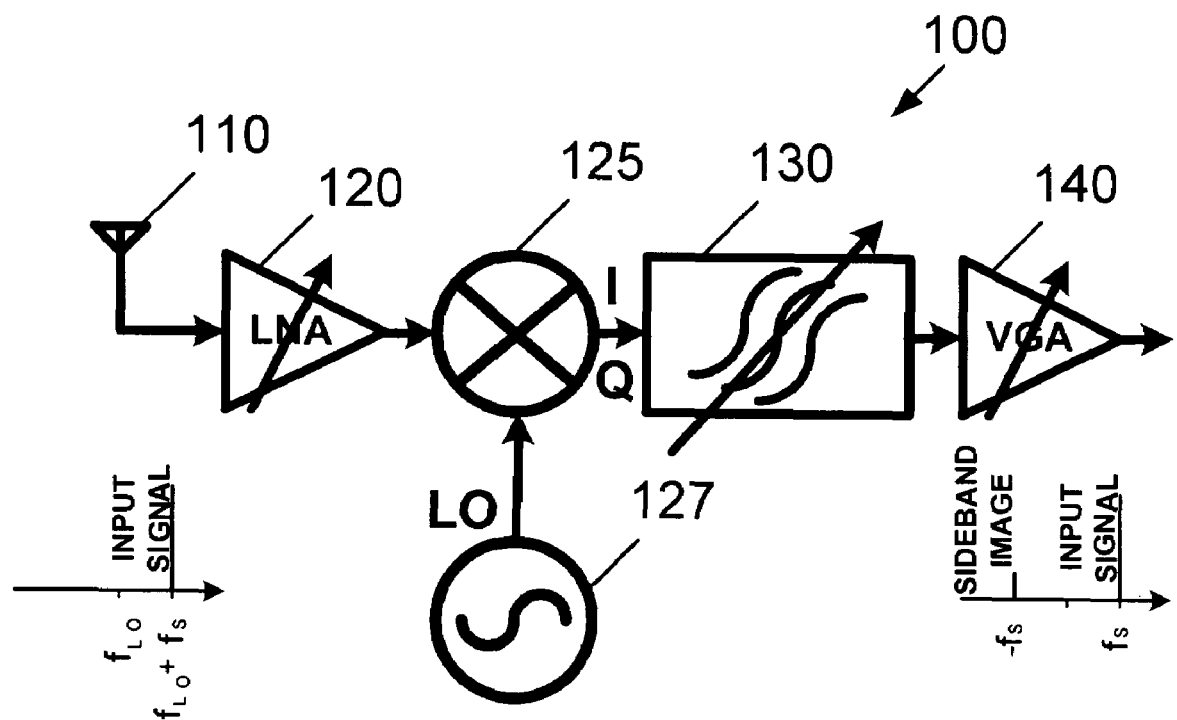
FIG. 1 illustrates high frequency IQ separation in a conventional RF receiver.
Figure 2:
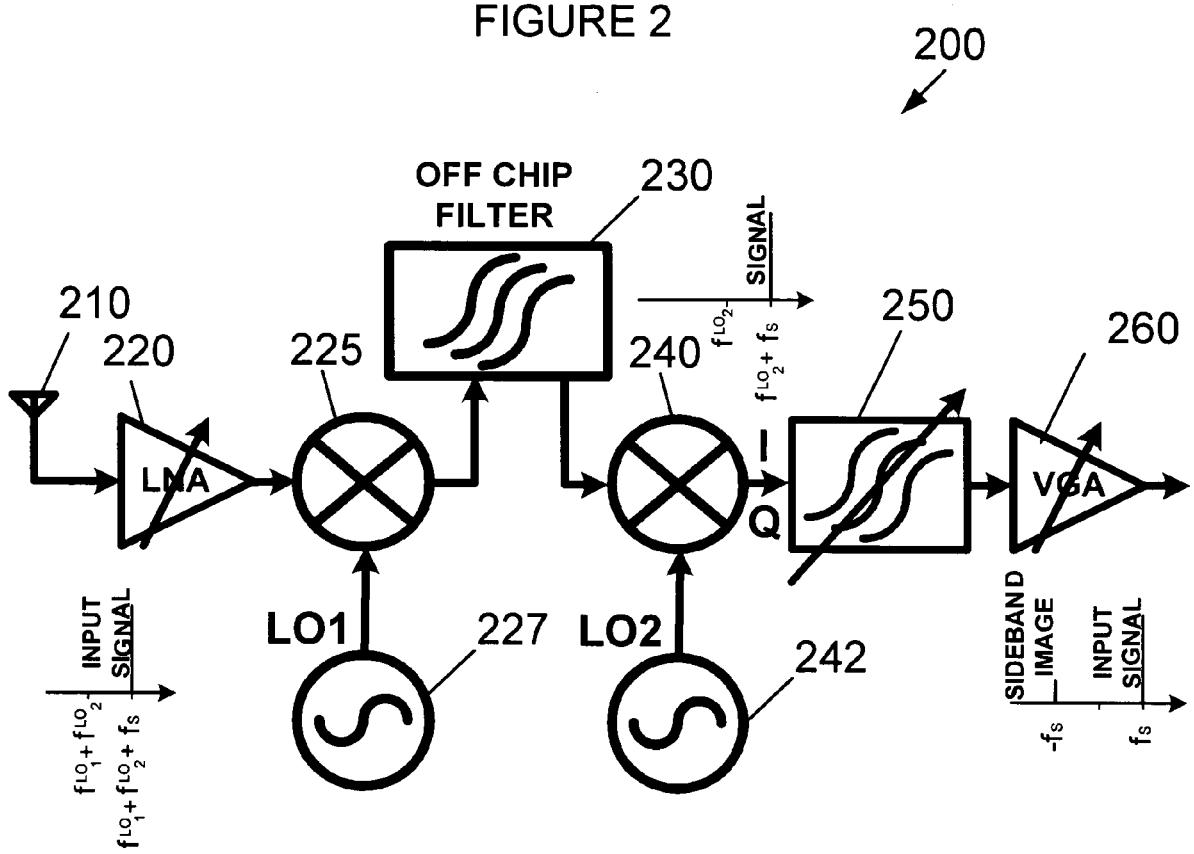
FIG. 2 illustrates lower frequency IQ separation in a conventional RF receiver.
Figure 3:
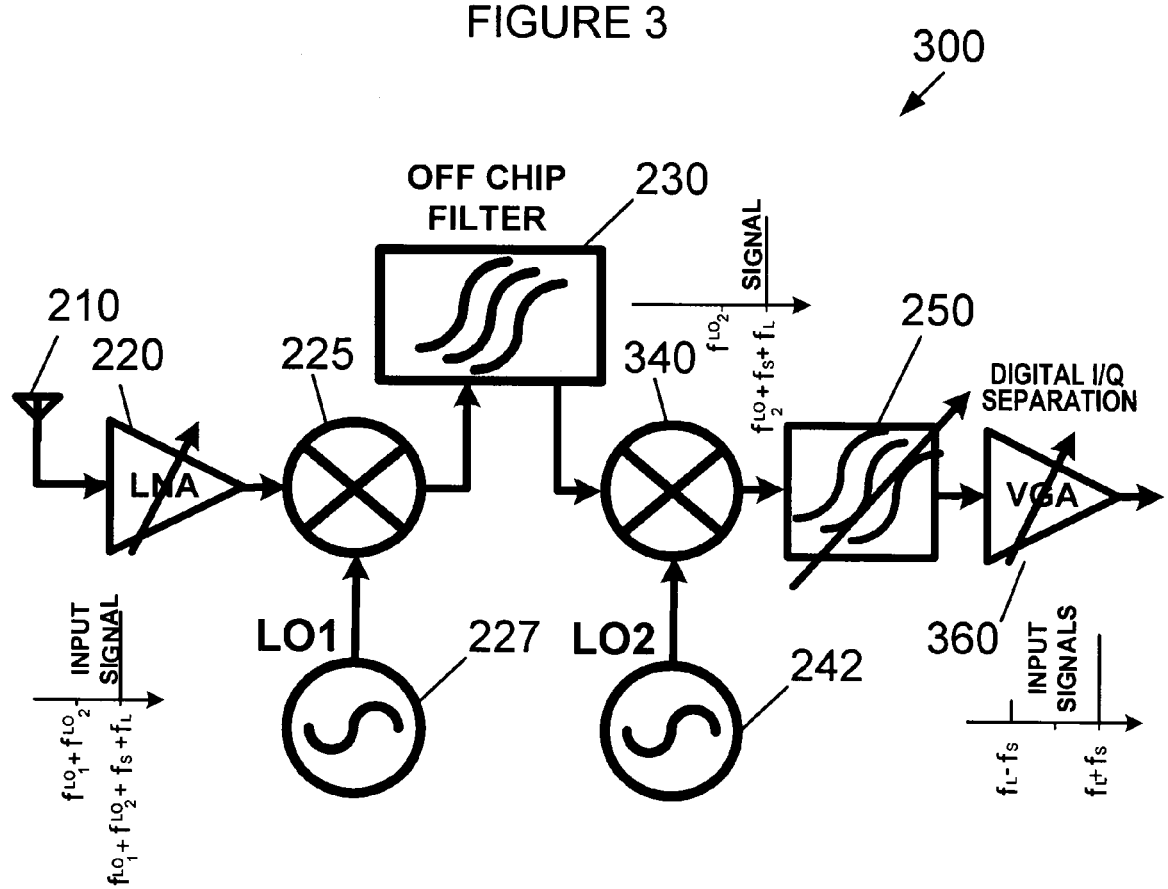
FIG. 3 illustrates IQ separation in a conventional digital baseband receiver.
Figure 4:
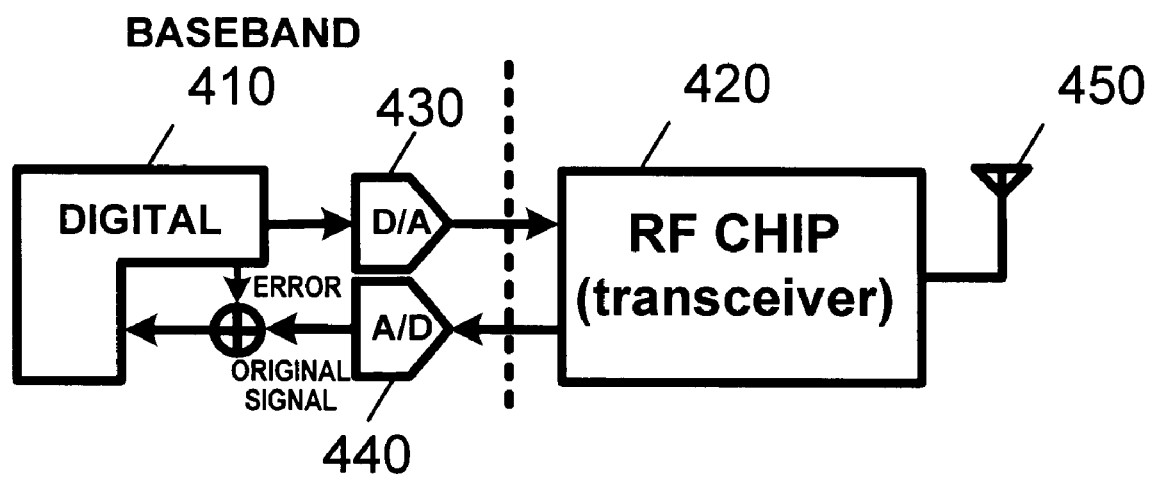
FIG. 4 illustrates a first conventional type of digital baseband calibration for receiver mismatch.
Figure 5:
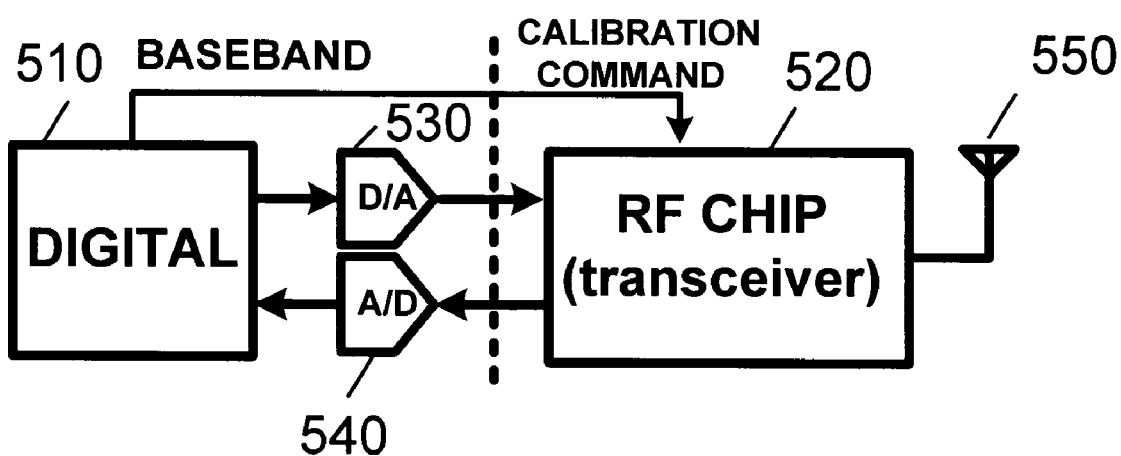
FIG. 5 illustrates a second conventional type of digital baseband calibration for receiver mismatch.
Figure 6:
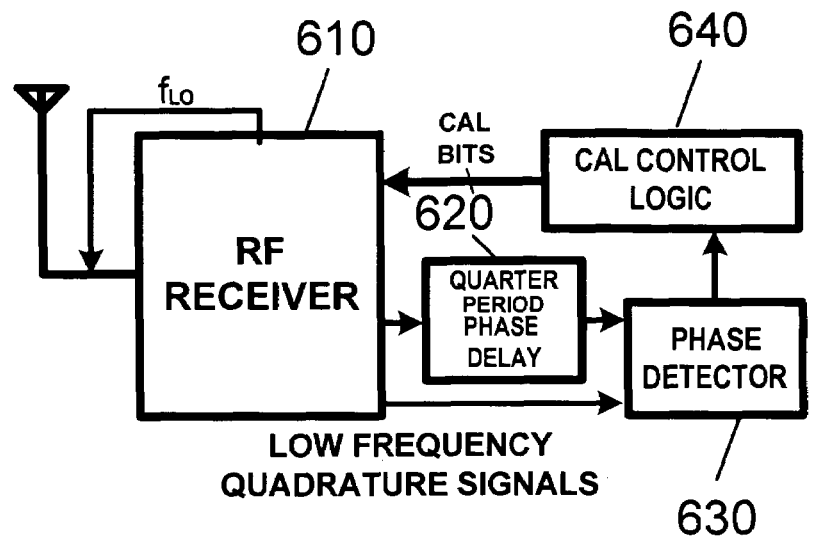
FIG. 6 illustrates a calibration system according to a first embodiment of the invention.

FIG. 6 shows a calibration system for receiver phase mismatch, according to a first embodiment of the invention. In the first embodiment, a down-conversion mixer in an RF receiver 610 is capable of operating in a calibration mode that mixes a LO signal ($f_{LO}$) and another low frequency signal ($f_{LO2}$, not shown in FIG. 6) together. During calibration, the LO signal from the frequency synthesizer inside the RF receiver 610 is used as a test input tone ($f_{LO}$) to the RF receiver 610. A down-conversion mixer (internal to the RF receiver 610) is set into the calibration mode, whereby it mixes the input RF signal with a first LO signal (having a same frequency as the input RF signal) and another low frequency signal serving as a second LO signal, whereby this mixing is referred to as 'slide mixing.' In this way, the down-conversion mixer generates the quadrature outputs having a frequency that is equal to the frequency of the second LO.

The phase mismatches of the LO signals and the down conversion mixer itself are added together in the system and method according to the first embodiment, whereby the phase mismatches are superposed to the output quadrature signals. Since the low frequency LO signal has insignificant phase mismatch, the output quadrature signals' phase mismatch mainly comes from the high frequency LO signals and down-conversion mixer, whereby that phase mismatch is translated into a low frequency domain through the slide mixing technique.

A voltage control delay circuit (VCDL) circuit, which has preferably been calibrated beforehand, adds a certain amount of delay to one of the low-frequency quadrature signals so that the I and Q signals have equal phase if there is no mismatch. The VCDL circuit is shown as the Quarter Period Phase Delay Circuit 620 in FIG. 6. In this case, the VCDL delays by 90 degrees the I channel signal, which leads the Q channel by 90 degrees, whereby the Q channel is in phase with the delayed signal, assuming that there is no phase mismatch. When a phase mismatch does exist, a phase detector (PD) circuit 630 measures the phase difference between the delayed quadrature signals with high accuracy, and regulates the phase delay in the LO signals and down-conversion mixer to decrease that mismatch. For example, if 0.18 um CMOS technology is used, the accuracy of the PD circuit 630 may be as precise as 10 picoseconds or less.

Alternative to the structure shown in FIG. 6, a three-quarters period phase delay unit may be provided on the Q path output of the RF receiver 610, instead of the system shown in FIG. 6 having a one-quarter period phase delay unit provided on the I path output of the RF receiver 610. In yet another alternative structure, two separate phase delay lines may be provided on the I and Q paths, whereby the difference between them is predetermined (e.g., one-half period phase delay on I path and a quarter period phase delay on Q path; three-quarters period phase delay on I path and one-half period phase delay on Q path, etc.) Note that this embodiment of the present invention it is not limited to the case where the Q channel leads the I channel by a quarter period. It could also be used in the case where the I channel leads the Q channel by a quarter period.

Also shown in FIG. 6 is a calibration control logic unit 640, which receives the phase detected output of the PD circuit 630, and which provides calibration control (by way of calibration bits) to the RF receiver 610. The calibration control logic unit 640 may include hardware components (e.g., logic gates) and/or software implemented by way of a microprocessor.

Assuming that a 1 MHz low frequency signal is used as the low frequency signal ($F_{LO2}$) in the calibration mode and the calibrated VCDL circuit 620 has a 0.3 nanoseconds offset delay away from the quarter period, which is not small compared with a general VCDL circuit, the calibration timing accuracy is estimated to be 0.31 nanoseconds, which is equivalent to 0.13 degrees for a 1 MHz signal. Thus, the calibrated phase mismatch of the RF receiver 610 can be as small as 0.13 degrees theoretically. The calibration system and method according to the first embodiment utilizes a slide mixing technique to translate the immeasurable high frequency phase mismatch into a measurable low speed timing mismatch, in order to increase the calibration accuracy. If a lesser phase mismatch is required, an even lower frequency second LO signal (e.g., 500 KHz) could be used. However, this would require additional time operating in the calibration mode to determine and correct the phase mismatch.

Compared with conventional calibration methods described previously, the calibration system and method according to the first embodiment has the advantages of: 1) stand alone calibration circuit without the need for a transmitter and a baseband DSP; 2) small extra mismatch to the receiver circuit introduced by the calibration circuit; 3) capability to calibrate to the minimum phase mismatch of the receiver; 4) small chip area; 5) fast calibration and no stability problem; and 5) if the gain (amplitude) mismatch requirement is tight, an extra circuit could be utilized in a digital baseband circuit, which also works for a stand-alone receiver chip and becomes much simpler without the concern for phase mismatch.

The mismatch in a wireless receiver arises primarily from asymmetrical layout and device mismatches introduced by imperfect process lithography and doping. Although the asymmetry in the layout could be avoided by thorough better manufacturing techniques, device mismatches cannot be removed completely. This is especially true in the high frequency domain where the application of layout optimization techniques such as crossing, interdigitation and devices with larger active area could limit the speed of the circuit.

There are mismatches between differential circuits and between I/Q branches that make the output signals not fully differential nor fully quadrature. The mismatched differential signals can be decomposed into the summation of a common signal and a fully differential signal with an additional offset DC voltage. The common signal mismatch in the receiver is attenuated by a common mode feedback circuit with a large Common Mode Rejection Ratio (CMRR) inside a filter circuit and a variable gain amplifier (VGA), which does not degrade the signal receiving capability. Also, the offset DC voltage can be removed by a DC offset cancellation circuit. Thus, the circuit differential mismatch is not a serious issue in a receiver design and does not corrupt the receiving signals. However, the circuit quadrature mismatches distort the incoming signals if a modulation method higher than BPSK (e.g., 8-ary PSK, 16-ary PSK, 64QAM) is adopted.

Figure 7A:
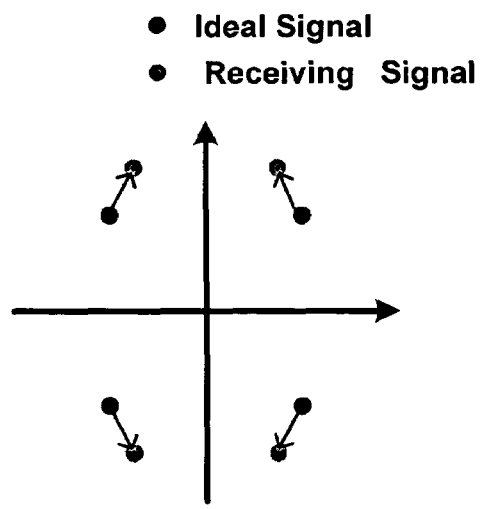
FIGS. 7A and 7B illustrate a QPSK constellation received due to phase mismatch and amplitude mismatch, respectively.
Figure 7B:
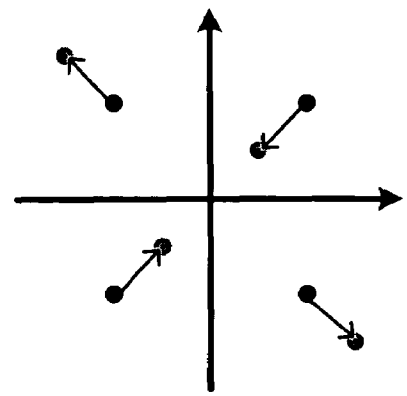

FIGS. 7A and 7B show a receiving QPSK signal constellation when there are phase mismatch and amplitude mismatch between the I and Q branches, respectively. The EVM of the received signal is deteriorated accordingly.

Assume that the LNA output signal is A $\cos(\omega_{LO}t+\omega_s t)$, and the phase mismatch between the quadrature LO signals is $\phi_{iq1}$ and the down conversion mixer has gain mismatch $a_{iq2}$ and phase mismatch $\phi_{iq2}$. Then the output signals from the down conversion mixer can be expressed as $$S_I = \frac{A}{2}[\cos(2\omega_{LO}t + \omega_s t) + \cos(\omega_s t)]$$

$$S_Q = \frac{A(1+a_{iq2})}{2}[\sin(2\omega_{LO}t + \omega_s t + \phi_{iq1} + \phi_{iq2}) + \sin(-\omega_s t + \phi_{iq1} + \phi_{iq2})]$$

Now, assume that the baseband circuit, including the low pass filter and variable gain amplifier (VGA), has gain B with gain mismatch $a_{iq3}$ and a phase mismatch $\phi_{iq3}$, with a low pass corner that is much lower than the transmission RF frequency. In that case, the output quadrature signal from the RF chip can be expressed as $$S_I = \frac{AB}{2}\cos(\omega_s t)$$

$$S_Q = \frac{AB(1+a_{iq2})(1+a_{iq3})}{2}\sin(-\omega_s t + \phi_{iq1} + \phi_{iq2} + \phi_{iq3})$$

As explained earlier, mismatches in a wireless receiver arise primarily from asymmetrical layout and device mismatches introduced by imperfect process lithography and doping. According to the first embodiment, phase mismatch and gain mismatch are corrected inside the RF transceiver chip itself, in a sort-of self-calibration mode. Since the LO signals and the down conversion mixer contribute most of the phase mismatch in the receiver chain, the LO generator is preferably the best candidate on which to perform phase mismatch calibration.

Figure 8:
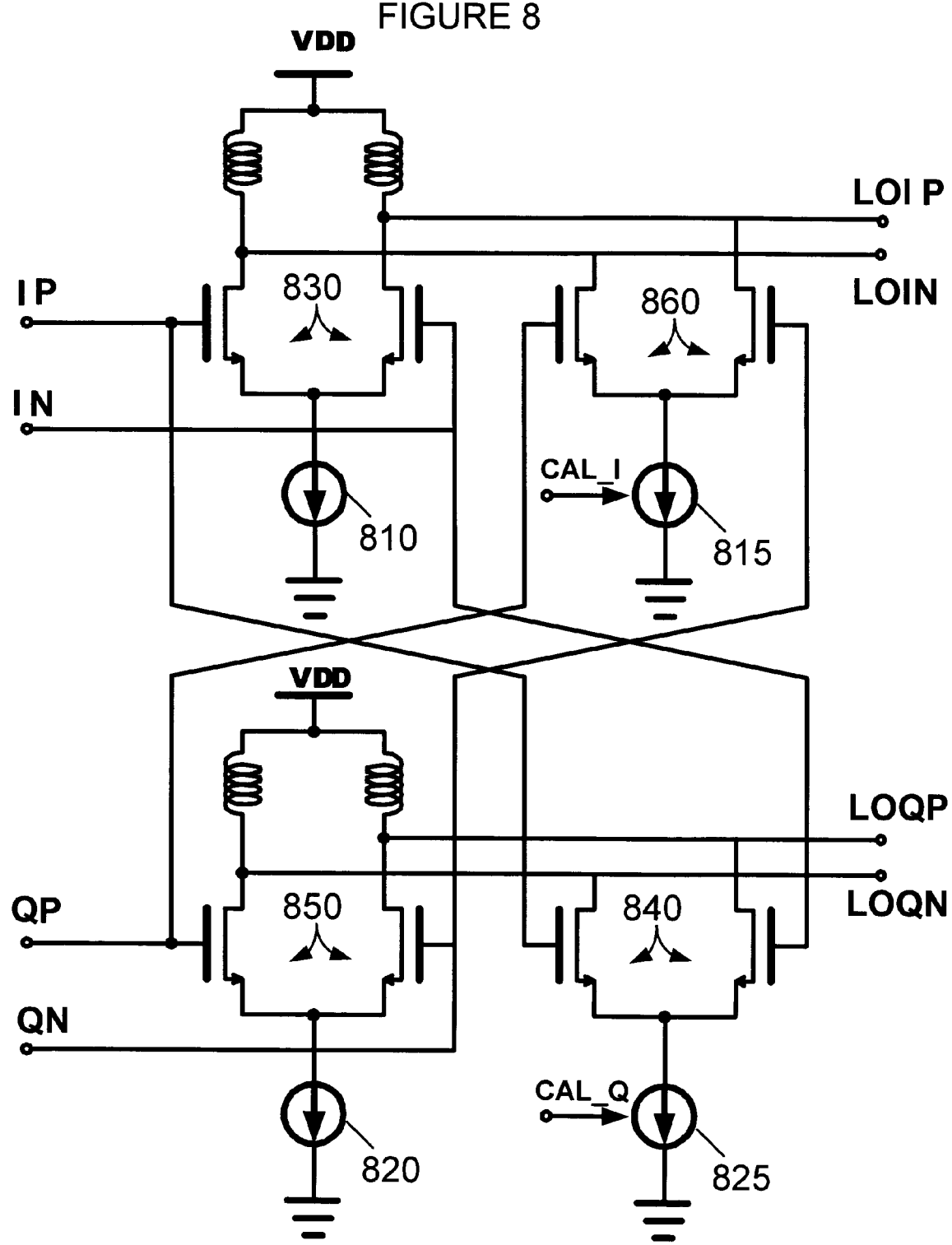
FIG. 8 illustrates phase interpolation in an LO generator, according to at least one embodiment of the invention.

FIG. 8 shows a circuit to tune the quadrature mismatch of LO signals so as to perform phase interpolation in a LO generator. Calibration of the LO generator 800 is achieved by way of current bias sources 810, 815, 820, 825, under control of current bias signals CAL_I and CAL_Q applied to the I and Q channels, respectively. The I signal input is shown as a differential pair IP, IN ("P" denotes positive signal line, "N" denotes negative signal line), and the Q signal input is shown as a differential pair QP, QN. The LO signals are shown as LOIP, LOIN for the differential LO signal pair on the I channel, and LOQP, LOQN for the differential LO signal pair on the Q channel. The I channel input signal differential pair IP, IN are respectively applied to gates of a first pair of transistors 830 and a second pair of transistors 840, whereby LOIP, LOIN are respectively generated by the first pair of transistors and whereby LOQP, LOQN are respectively generated by a third pair of transistors 850. A similar structure exists for the Q channel input signal differential pair QP, QN, with respect to the third pair of transistors 850 and a fourth pair of transistors 860.

Figure 9:
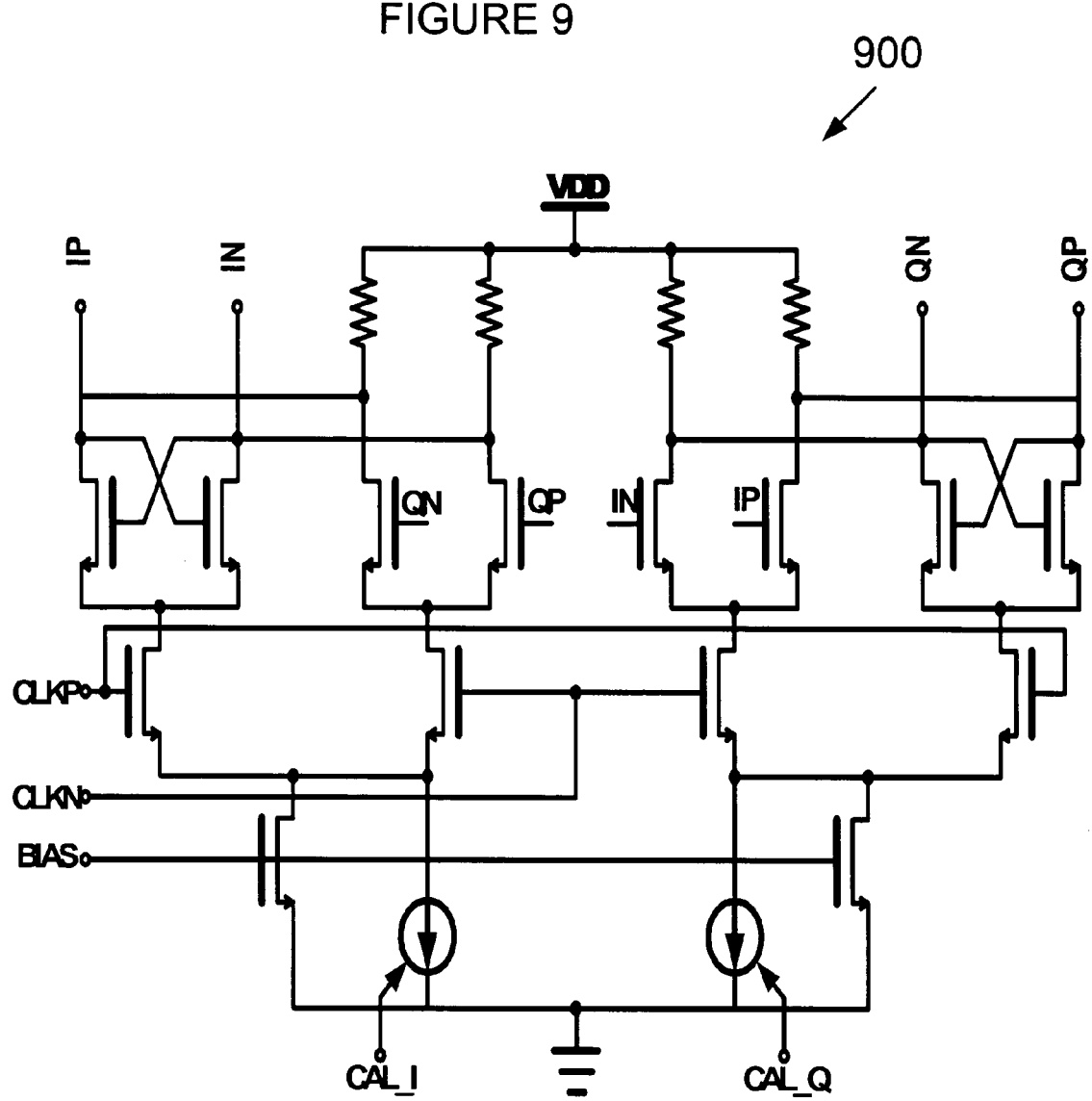
FIG. 9 illustrates phase and amplitude tuning in a divide-by-two circuit through bias current, according to at least one embodiment of the invention.

FIG. 9 shows another circuit used to separately correct the phase mismatch by increasing or decreasing the bias current in an I or Q branch of a quadrature LO signal generator, whereby the LO signal generator corresponds to a divide-by-2 circuit 900. In FIG. 9, phase and amplitude tuning is controlled through bias current, via the BIAS signal and the current bias signals CAL_I and CAL_Q. The phase mismatch generated by a down conversion mixer can be removed in a similar way.

Figure 10:
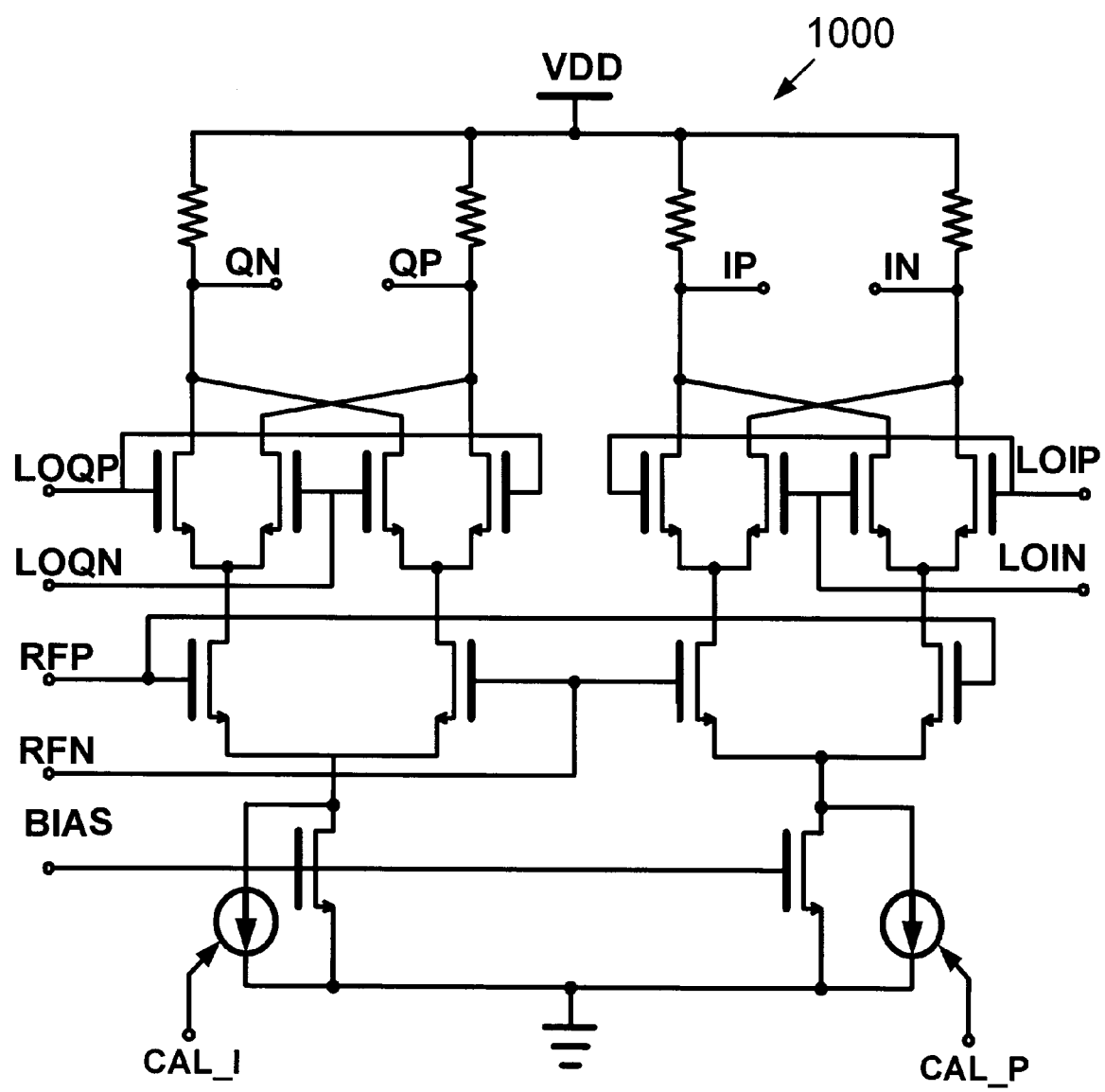
FIG. 10 illustrates a down conversion mixer that performs mismatch calibration through bias current, according to at least one embodiment of the invention.

FIG. 10 shows a down conversion mixer 1000, whereby the phase delay of the I and Q branches are tuned by changing the bias current in the down conversion mixer 1000, according to a second embodiment of the invention. This not only changes the phase mismatch but also the amplitude mismatch between the I and Q branches. Since the phase mismatch and gain mismatch of a down conversion mixer arise from the same devices mismatches inside the down conversion mixer, they tend to track each other.

Figure 11:
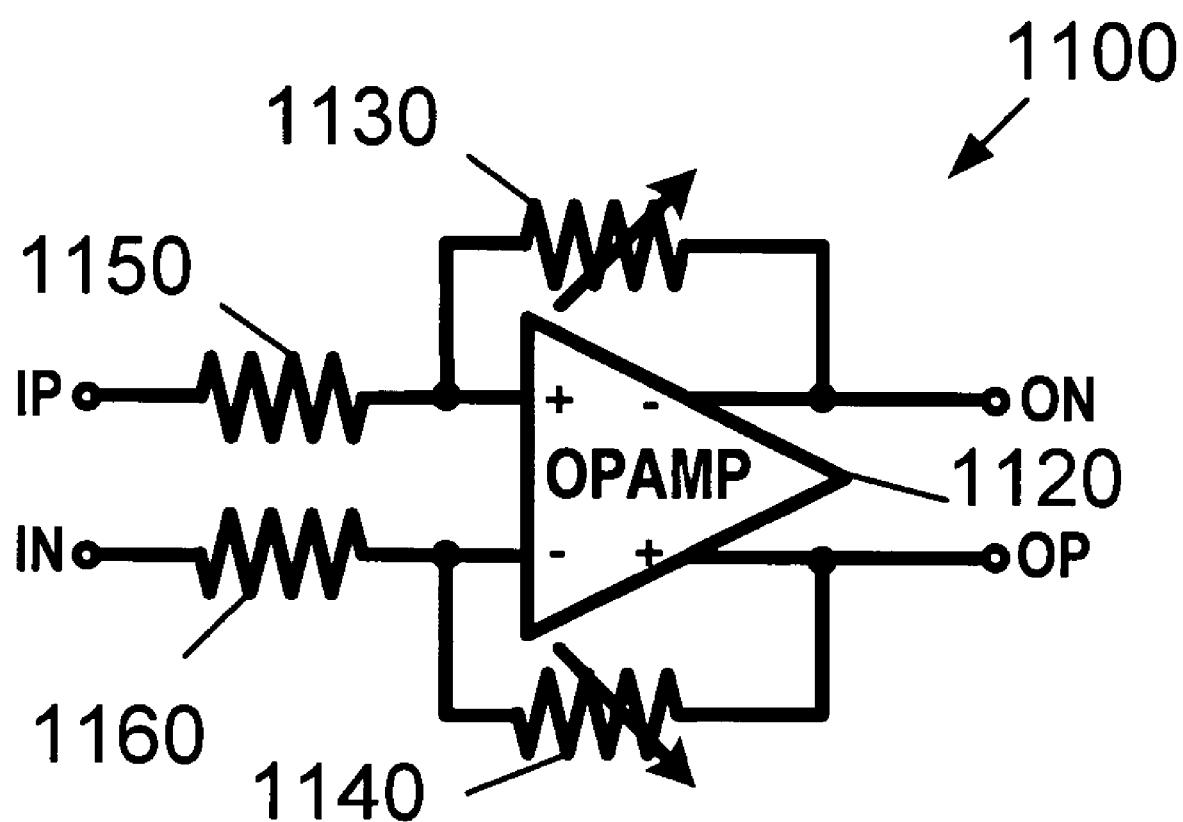
FIG. 11 illustrates a gain mismatch calibration circuit according to at least one embodiment of the invention.
Figure 13:
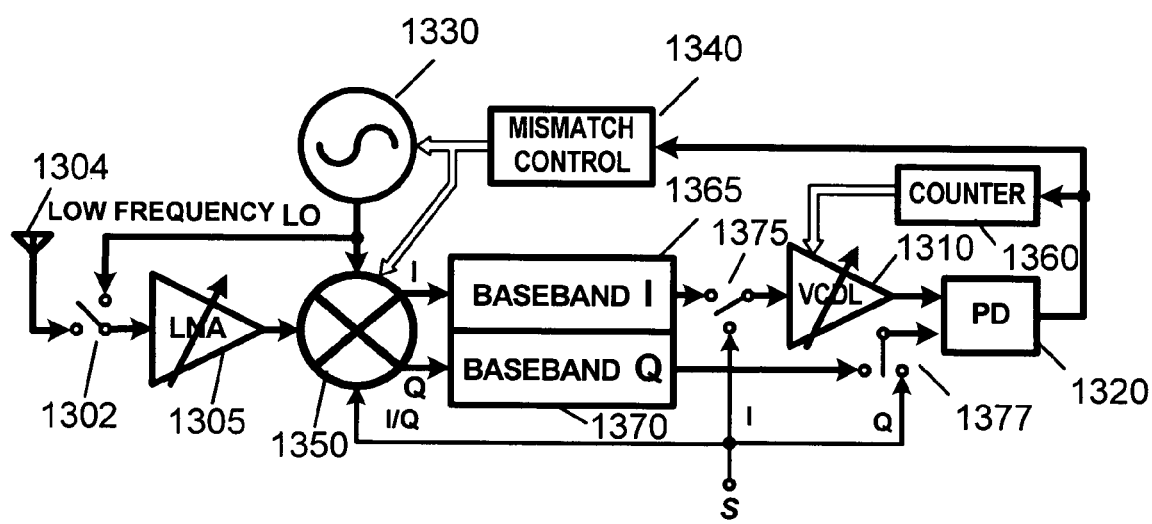
FIG. 13 illustrates a receiver architecture for performing mismatch calibration, according to at least one embodiment of the invention.
Figure 14:
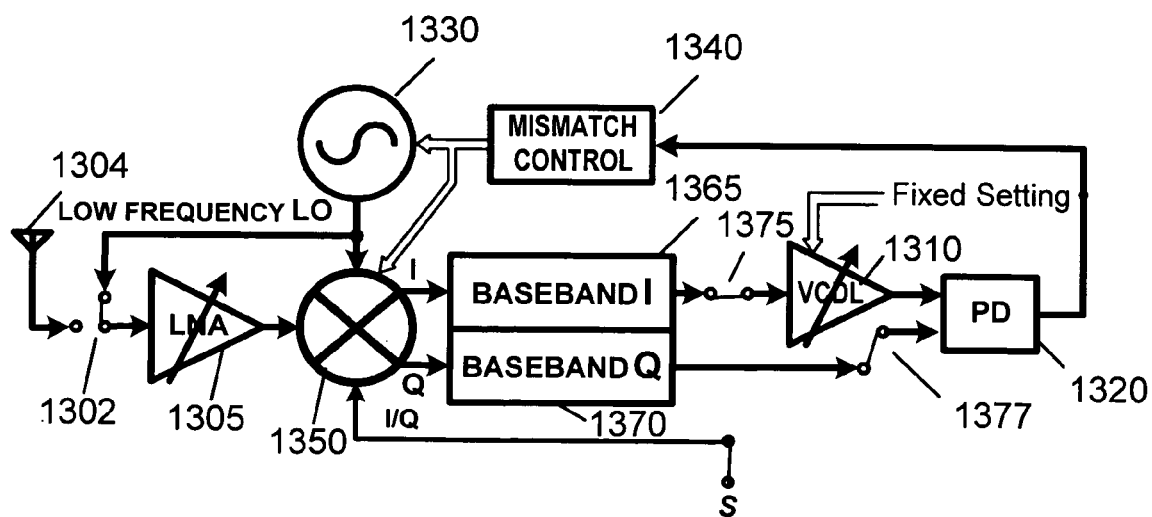
FIG. 14 illustrates the receiver architecture of FIG. 13 operating in calibration mode.
Figure 15:
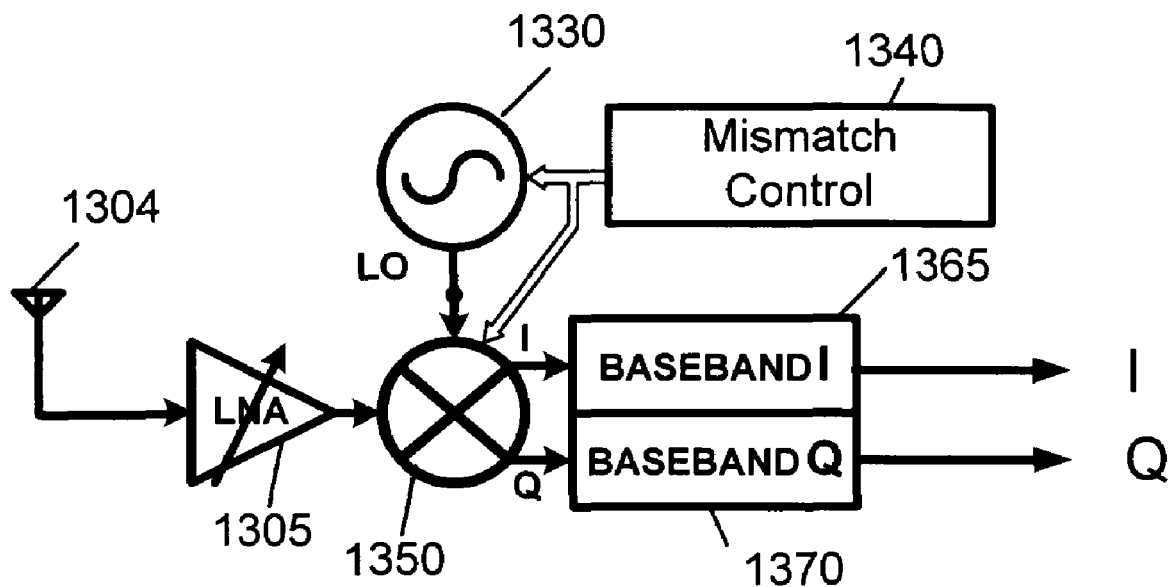
FIG. 15 illustrates the receiver architecture of FIG. 13 operating in normal operating mode.

The gain mismatch of an RF receiver can be corrected through digitally trimming a feedback resistor inside a VGA as shown in the circuit 1100 of FIG. 11, which may achieve up to 0.1 dB accuracy based on simulations performed by the inventors. The circuit 1100 of FIG. 11 may be implemented in the Baseband I unit or the Baseband Q unit as shown in FIGS. 13, 14 and 15, whereby those units would also include a frequency filter and a VGA. The circuit 1100 includes an OP Amp 1120, trimming resistors 1130, 1140, and input resistors 1150, 1160.

For conventional calibration methods, the receiver mismatch is detected through collaboration between the transmitter and the receiver pair. Also, the mismatch detection is done in a digital baseband circuit for conventional methods, which requires substantial computation power and in which the transmitter baseband circuit also needs to send out the test pilot signal during calibration. In each of the embodiments of the invention described herein, the phase mismatch is detected inside the RF chip itself (the device to be calibrated) with high accuracy, and whereby all of the test signals used for calibration are generated from the frequency synthesizer within the RF chip itself. These signals are the LO signals and a low frequency signal from a reference generator, whereby the low frequency signal may be a 1 MHz signal, for example. Other low frequency values may be utilized for the low frequency signal, such as a value between 50 kHz and 5 MHz, for example.

Figure 12:
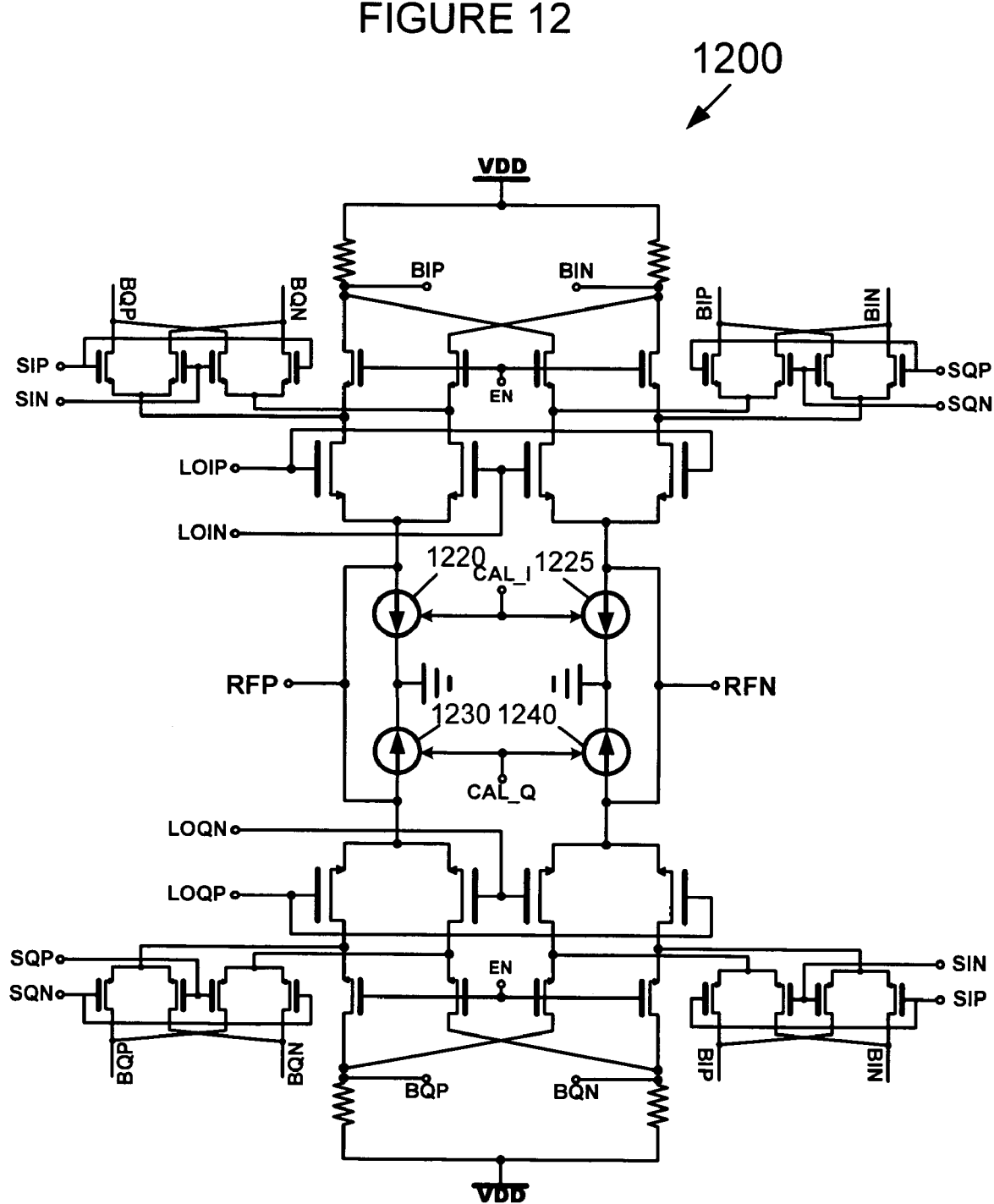
FIG. 12 illustrates an NMOS down conversion mixer with calibration setting, according to at least one embodiment of the invention.

FIG. 12 shows an NMOS down conversion mixer 1200 having a calibration setting feature, according to a third embodiment of the invention. In a normal working mode (e.g., a non-calibration mode), the enable signal EN is high and the inputs SIP, SIN, SQP and SQN are low, so the input RF signal is modulated with LO and sent to the resistor load through the enable transistors. In a calibration mode, the enable signal EN is low, and thus input signals cannot pass through the enable transistors. The inputs SIP, SIN, SQP and SQN are injected with low frequency quadrature signals in the calibration mode. In the calibration mode, the RF input signal pair RFP, RFN is modulated by both the high frequency LO (LOIP, LOIN, LOQP, LOQN) and the low frequency LO (SQP, SQN, SIP, SIN). Assuming the high frequency LO signal is $\sin(\omega_{LO}f)/\cos(\omega_{LO}f)$ and the low frequency LO signal is $\sin(\omega_L f)/\cos(\omega_L f)$, the equivalent LO signal in this mixer during calibration can be expressed as:

$$Q \text{ branch } LO \text{ signal} = \sin(\omega_{LO}f + \omega_L f)$$

$$I \text{ branch } LO \text{ signal} = \cos(\omega_{LO}f + \omega_L f)$$

The input RF signal is modulated with the equivalent LO signals $\sin(\omega_{LO}f + \omega_L f)/\cos(\omega_{LO}f + \omega_L f)$, which is referred to as slide mixing in the down conversion mixer. Since the second low frequency LO signals SQP, SQN, SIP, SIN have little quadrature mismatch and the mismatch contribution from this low frequency mixing is very small, there is negligible mismatch introduced by this second low frequency LO. The down conversion mixer architecture according to the third embodiment can also be used in PMOS, BiPolar and BiCMOS technology mixers.

During calibration, the high frequency LO signal $\sin(\omega_{LO}f)$ is sent to the LNA input as the receiver input signal. The down conversion mixer with calibration setting as shown FIG. 12 is in the calibration mode. Thus, the mixer output signals are $$\frac{1}{2}[\sin(2\omega_{LO}t + \omega_L t) - \sin(\omega_L t)] \text{ and}$$

$$\frac{1}{2}[\cos(2\omega_{LO}t + \omega_L t) + \cos(\omega_L t)]$$

respectively. Considering the phase mismatch $\phi_{iq1}$ of the high frequency LO signal and the phase mismatch $\phi_{iq2}$ introduced by the high frequency mixing and omitting the small phase mismatch of the filter and VGA, the output signals from the baseband circuit can be expressed as $$\frac{1}{2}\sin(-\omega_L t + \phi_{iq1} + \phi_{iq2}) \text{ and } \frac{1}{2}\cos(\omega_L t).$$

Here, the circuit gain and the small gain mismatch have not been factored in yet.

Through the use of slide mixing, the high frequency phase mismatch is translated into a low frequency phase mismatch without extra introduced phase error. For example, if a 1 MHz low frequency LO signal is utilized and the overall phase mismatch of the high frequency LO signal and the down-conversion mixer is 2 degrees, the output signals are 1 MHz quadrature signals with 2 degree quadrature phase mismatch, which is equivalent to 5.56 ns timing mismatch between the I and Q output signals ($1/1\times10^6*2/360$). If a lower second LO signal is used (e.g., lower than 1 MHz), the conversion rate from the phase mismatch to the output timing mismatch becomes even larger.

The components shown in the middle of the circuit of FIG. 12 provide for the calibration of the down conversion mixer 1200. In particular, bias current sources 1220, 1225, 1230, 1240 receive bias current signals CAL_I, CAL_Q, under control of a calibration control logic unit (see FIG. 6, for example).

FIG. 13 shows a receiver architecture with a phase mismatch calibration circuit, according to a fourth embodiment of the invention. When doing calibration (the calibration/normal operation signal "S" being set to a value indicating calibration mode), the input to the LNA 1305 is a high frequency LO signal generated from the frequency synthesizer circuit. This is achieved by way of a switch 1302 set to the calibration mode, whereby during normal operation the output of the RF antenna 1304 is provided directly to the LNA 1305 and during the calibration mode a LO signal output from the high frequency LO generator 1330 is provided directly to the LNA 1305. The down conversion mixer 1350 is set to the calibration mode with the high frequency LO signal output from the high frequency LO generator 1330 as the first LO and with a low frequency signal output from a reference generator circuit (not shown) as the second LO. Through the use of slide mixing, the outputs are quadrature signals with the phase mismatch of the high frequency LO signals and the down conversion mixer 1350, whose frequency equals to that of the low frequency signal output from the reference generator circuit. In an alternative configuration, the LO generator 1330 may provide both the high frequency LO signal and the low frequency LO signal to the down conversion mixer 1350, whereby a separate reference generator circuit is not needed in that case.

By way of example and not by way of limitation the high frequency LO signal may have a value typically used as a wireless rf signal, such as a frequency value between 100 MHz and 15 GHz. For example, a value between 2.4 and 2.5 GHz or a value between 4.9 and 6.0 GHz may be utilized for wireless LAN systems.

The mismatch of the signals remains the same after passing through an I and Q analog baseband circuit 1365, 1370, since the low frequency baseband circuit introduces negligible mismatches. The I branch signal is delayed 270 degree by a calibrated voltage control delay line (VCDL) 1310 when in the calibration mode, whereby it would have the same phase as the Q branch signal if there was no phase mismatch between the I and Q signals. When in the calibration mode, a phase detector circuit (PD) 1320 senses the phase offset between I and Q signals which is actually the phase mismatch between them, and passes the phase mismatch information to a mismatch control circuit 1340. Switches 1375 and 1377, under control of the calibration/normal operation signal S, either send the respective outputs of the I Baseband Unit 1365 and the Q Baseband unit 1370 to the VCDL 1310 and the PD 1320, respectively, when in the calibration mode, or to a baseband processing unit (e.g., a digital signal processor, not shown) when in the normal operation mode.

The mismatch control circuit 1340 regulates the mismatch calibration settings inside a high frequency LO generator 1330 and a down-conversion mixer 1350, to cancel their mismatches. The cancellation ratio between the high frequency LO generator 1330 and the down conversion mixer 1350 may be determined by the mismatch contribution from them using Monte Carlo simulation, in one possible implementation. Once a calibration loop control circuit (which includes a counter 1360 along with the mismatch control circuit 1340) searches for the setting with the minimum phase mismatch, the calibration process is stopped, and the peripheral calibration circuits such as the VCDL 1310 is disabled. This optimized setting is stored digitally and applied until the next calibration.

The high frequency LO generator 1330 may correspond to either of the structures shown in FIGS. 8 and 9, for example, and the down conversion mixer 1350 may correspond to either of the structures shown in FIGS. 10 and 12, for example.

FIG. 14 shows the receiver architecture of FIG. 13 during calibration, whereby the switch 1375 provided between the baseband I unit and the VCDL 1310 is in the calibration setting. The mismatch cancellation according to the first embodiment occurs locally and minimizes the physical mismatch introduced by process variation, which is not sensitive to temperature and environment. Thus, it can be done once during the system power up, whereby it does not need to be performed again.

During normal operation, the LNA 1305 receives the input signal from the antenna and sends it to the down conversion mixer 1350 set in normal operation mode. The LO generator 1330 supplies the LO signals to the down conversion mixer 1350, and baseband circuits in the Baseband I unit 1365 and the Baseband Q unit 1370 amplify and filter the I/Q output signals from the mixer 1350 and send them to a digital baseband unit (not shown). The LO generator 1330 and the down conversion mixer 1350 are free of mismatches due to their being calibrated during the calibration mode, whereby the signal flow during normal operation is shown in FIG. 15. A fixed voltage setting is provided to the LO generator 1330 and mixer 1350 in the normal operating mode, whereby the fixed voltage setting is determined during the calibration mode.

The calibration accuracy of at least one embodiment of the present invention is determined primarily by the PD 1320 and by the VCDL 1310. A digital phase detector can be utilized, which has very high phase detection accuracy. For example, the phase detector designed in 0.18 um CMOS technology can determine timing mismatch less than 10 psec. If a 1 MHz low frequency signal is adopted for receiver calibration, the 10 psec timing mismatch is equivalent to 3.6 mdeg, which is small compared with the 1 degree phase mismatch requirement of the RF receiver. Accordingly, the potential calibration accuracy for at least one embodiment of the present invention is determined by the accuracy of the 90 degree phase delay of the VCDL if one assumes infinitesimal LO signal and down conversion mixer calibration accuracy.

Figure 16:
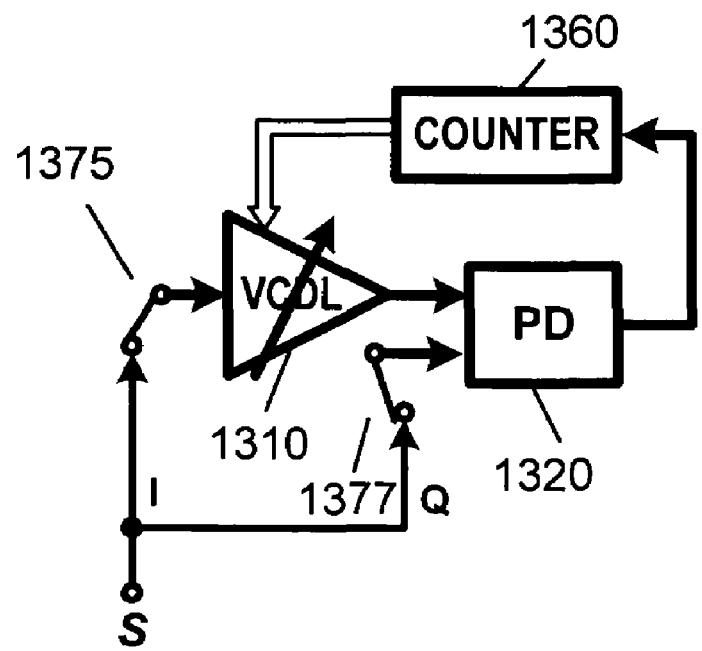
FIG. 16 illustrates the VCDL calibrating setting portion of the receiver architecture of FIG. 13.

FIG. 16 shows a circuit to perform VCDL calibration before doing the receiver mismatch calibration, where the same phase detector is used as shown in the previous figures. After calibration, the VCDL 1310 has the 270 degree phase delay with virtually no timing offset. Two low frequency quadrature signals are sent as I and Q signals (labeled as S in FIG. 16), one is delayed by the VCDL and the other one is directly fed into the PD. A counter 1360 is used to count the time difference between the signals on the I and Q channels, so as to determine a timing mismatch between those signals. If 0.18 um CMOS technology is used, the offset time away from the three quarter period is less than 100 psec, which is equivalent to 36 mdeg when a 1 MHz low frequency calibration signal is used. Thus, the theoretical calibration accuracy is less than 0.1 degree if a 1 MHz low frequency calibration tone is adopted, and the lower the calibration tone is used, the higher the potential calibration accuracy.

Figure 17A:
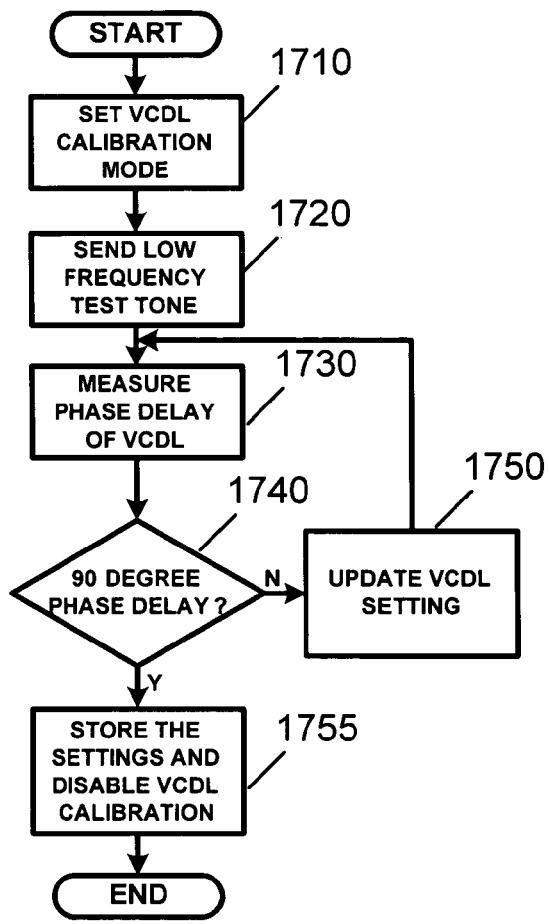
FIGS. 17A and 17B illustrate the calibration flow for VCDL and receiver mismatch, respectively.
Figure 17B:
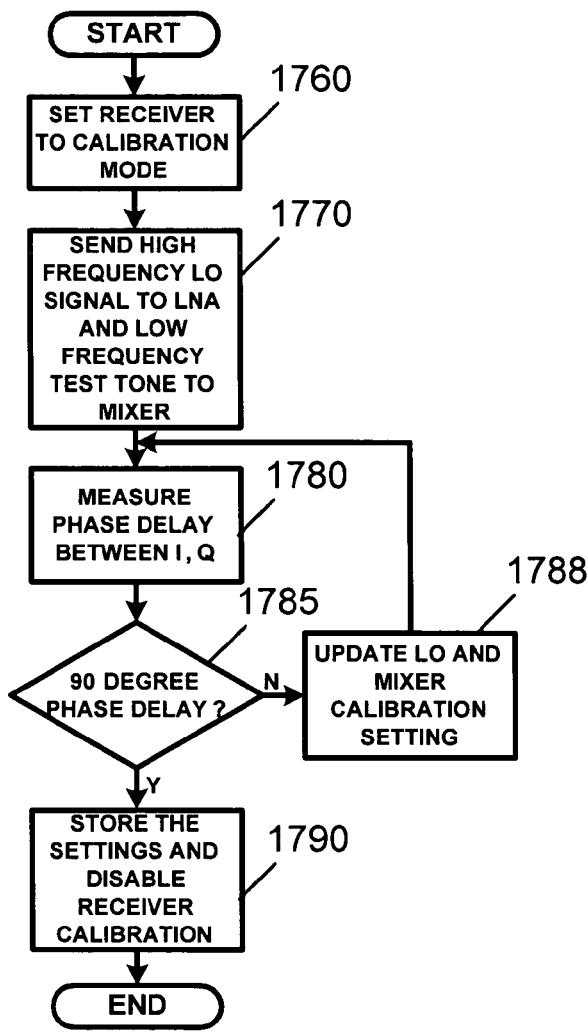

FIGS. 17A and 17B respectively show a VCDL calibration flow method and a receiver calibration flow method according to a preferred embodiment of the invention. These flows may be implemented by the calibration control logic unit as shown in FIG. 6, for example. In the VCDL calibration flow as shown in FIG. 17A, the VCDL calibration mode is set at step 1710, and a low frequency test tone is sent in step 1720. The phase delay of the VCDL is measured in step 1730, and then it is determined if a 90 degree phase delay is achieved in step 1740. If no, the VCDL setting is updated in step 1750, and the process returns to step 1730. The update method could be exhaustive searching or to increase or decrease the delay of VCDL according to whether the delay of the VCDL is longer or shorter than the predetermined delay. If yes, the settings are stored and the VCDL calibration is disabled in step 1755.

In the receiver calibration flow as shown in FIG. 17B, the receiver is set to the calibration mode in step 1760. A high frequency LO signal is sent to the LNA and a low frequency test tone is sent to the mixer in step 1770. The phase delay between the I and Q channels is measured in step 1780. It is then determined at step 1785 if a 90 degree phase delay is achieved between the I and Q channels. If no, the LO and mixer calibration settings are updated in step 1788, and the process returns to step 1780. The update method could be exhaustive searching or to increase or decrease the mismatch setting according to relations between the I and Q channel outputs. For example, if the measured phase delay between the I and Q channel outputs are less than the predetermined 90 degree phase delay, the mismatch settings in LO generator and mixer will be updated to increase the phase mismatch between the quadrature signals. If yes, the settings are stored and the receiver calibration mode is disabled in step 1790, whereby the receiver can now operate in its normal operation mode.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A calibration system for an RF system that includes an rf receiver capable of operating in a normal mode and in a calibration mode, comprising:
   one or more phase/amplitude mismatch calibrating elements integrated with at least one RF receiver component selected from the group composed of a local oscillation buffering circuit, a divide-by-two circuit, and a down conversion mixer;
   a calibrated phase delay unit provided on at least one of an I channel output and a Q channel output of the RF receiver;
   a phase detector configured to detect a phase difference between the I channel output of the RF receiver and the Q channel output of the RF receiver with the calibrated phase delay; and
   a calibration control unit configured to provide a calibration control signal to the RF receiver based on the phase difference as provided by the phase detector;
   wherein the calibrated phase delay unit delays one or both of the I channel output and the Q channel output during a calibration mode to make I channel phase equal to Q channel phase.

2. The calibration system according to claim 1, wherein the RF receiver comprises:
   a frequency generator unit configured to provide a first LO signal to an input of the RF receiver when in the calibration mode, and a second LO signal lower in frequency than the first LO signal; and
   a mixer configured to receive the input to the RF receiver on an input port, and to mix the input signal with the first and second LO signals when in the calibration mode, and to provide a mixed output signal as a result.

3. The calibration system according to claim 2, further comprising:
   an RF antenna configured to receive a wireless signal when in the normal mode; and
   a low noise amplifier configured to receive the wireless signal output from the RF antenna when in the normal mode, and to receive the first LO signal output from the frequency generator unit as the input to the RF receiver when in the calibration mode, the low noise amplifier configured to provide a low-noise-amplified output to the RF receiver.

4. The calibration system according to claim 1, wherein the phase delay unit comprises a voltage controlled delay unit.

5. The calibration system according to claim 1, wherein the phase delay unit comprises a quarter-phase delay unit provided on the I channel or the Q channel output of the RF receiver.

6. The calibration system according to claim 1, wherein the phase delay unit comprises a three-quarters phase delay unit provided on the Q channel or the I channel output of the RF receiver.

7. The calibration system according to claim 1, wherein the calibration control unit comprises:
   a counter configured to provide a count value as a time delay signal to the phase delay unit, in accordance with the phase detected output provided to the counter by the phase detector.

8. The calibration system according to claim 2, wherein the calibration control unit provides a first calibration signal to the frequency generator unit and a second calibration signal to the mixer, based on the phase detected output provided by the phase detector.

9. The calibration system according to claim 1, further comprising:
   a baseband I filter provided between the I channel output of a frontend of the RF receiver and the phase delay unit; and
   a baseband Q filter provided between the Q channel output of the frontend of the RF receiver and the phase delay unit; and
   a gain mismatch control unit provided in at least one of the baseband I filter and the baseband Q filter outputs.

10. The calibration system according to claim 9, wherein the gain mismatch control unit comprises:
    an operational amplifier; and
    a feedback resistor provided between an input port and an output port of the operational amplifier.

11. The calibration system according to claim 1, wherein the calibration signal is a digital calibration signal.

12. The calibration system according to claim 1, wherein the calibrated phase delay unit comprises a plurality of multiple-quarter-phase delay units provided on one or both of the I channel and the Q channel outputs of the RF receiver.

13. A method of calibrating an RF receiver, comprising:
providing a first local oscillation signal to an input of the RF receiver during a calibration mode, as an calibration input signal;
mixing the calibration input signal with a second local oscillation signal at a same frequency as the first local oscillation signal, and with a third local oscillation signal at a frequency lower than the first and second local oscillation signals;
delaying at least one of signals on I and Q channel outputs of the RF receiver;
detecting a phase difference between the delayed, at least one of signals on the I and Q channels; and
providing a calibration signal to the RF receiver based on the detected phase difference.

14. The method according to claim 13, wherein the delaying step comprises:
delaying the I channel output by one-quarter of a period of the third local oscillation signal.

15. The method according to claim 13, wherein the providing step comprises:
providing digital calibration bits as the calibration signal to the RF receiver.

16. The method according to claim 13, wherein the providing step comprises:
providing the digital calibration bits to at least one of a mixer and a local oscillator of the RF receiver.

17. A calibration system for an RF system that includes an rf receiver capable of operating in a normal mode and in a calibration mode, comprising:
a phase delay unit provided on at least one of an I channel output and a Q channel output of the RF receiver;
a phase detector configured to detect a phase difference between the I channel output of the RF receiver and the Q channel output of the RF receiver; and
a calibration control unit configured to provide a calibration control signal to the RF receiver based on the phase difference as provided by the phase detector;
wherein the RF receiver comprises:
a frequency generator unit configured to provide a first LO signal to an input of the RF receiver when in the calibration mode, and a second LO signal lower in frequency than the first LO signal; and
a mixer configured to receive the input to the RF receiver on an input port, and to mix the input signal with the first and second LO signals when in the calibration mode, and to provide a mixed output signal as a result.

18. The calibration system according to claim 17, further comprising:
an RF antenna configured to receive a wireless signal when in the normal mode; and
a low noise amplifier configured to receive the wireless signal output from the RF antenna when in the normal mode, and to receive the first LO signal output from the frequency generator unit as the input to the RF receiver when in the calibration mode, the low noise amplifier configured to provide a low-noise-amplified output to the RF receiver.

19. The calibration system according to claim 17, wherein the calibration control unit provides a first calibration signal to the frequency generator unit and a second calibration signal to the mixer, based on the phase detected output provided by the phase detector.

20. The calibration system according to claim 17, wherein the phase delay unit comprises a plurality of multiple-quarter-phase delay units provided on one or both of the I channel and the Q channel outputs of the RF receiver.

* * * * *